March 22, 1927.
R. E. JOYCE
PRESSURE REGULATOR
Filed June 28, 1926
1,622,151
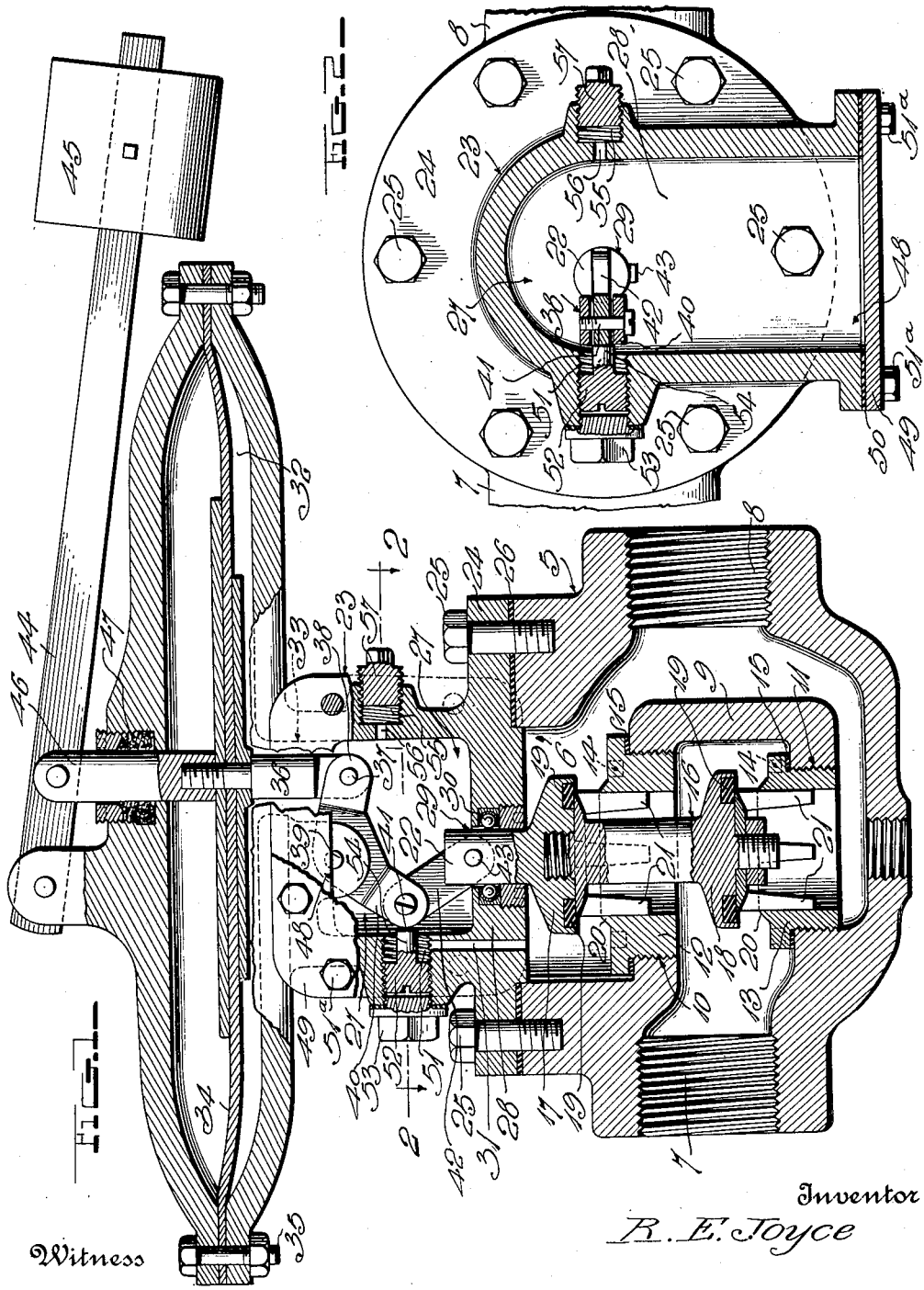
Inventor
R. E. Joyce
Witness
H. Woodard
By H. R. Willson & Co.
Attorneys Patented Mar. 22, 1927.

1,622,151

UNITED STATES PATENT OFFICE.

ROY E. JOYCE, OF MONTEBELLO, CALIFORNIA.

PRESSURE REGULATOR.

Application filed June 28, 1926. Serial No. 119,132.

The invention relates to improvements in automatic regulating valves such as those commonly used in gas lines, steam lines and other systems for handling fluid under pressure.

One object of the invention is to provide a new and improved construction which is such that all working parts of the regulator may be removed from the main body thereof, without the necessity of disconnecting said body from the pipe line. Thus, any necessary repairs may be made at the particular point where the regulator is installed, instead of necessitating that the latter shall be hauled to a repair shop, often distant therefrom. All pressure regulating valves with which I am familiar, can not be repaired at the points at which they are installed, because of the fact that the operating parts cannot be removed without the necessity of disconnecting the valves from the piping, and as a great many of the regulators weigh several hundred pounds, great expense is incurred monthly in removing defective regulators from pipe lines, possibly substituting others, and hauling the defective and the substitute regulators between shops at which repairs can be made, and numerous points at which the regulators are installed. By means of my invention, all of this trouble and expense is obviated, as any movable part may be quickly and easily taken out and repaired or a new part substituted, without the necessity of removing the main body of the regulator from the pipe line or main.

Heretofore, difficulty has been encountered in the provision of a pressure regulator whose valve will positively shut and remain closed without leakage, and such leakage very often causes disastrous results. It is a further aim of my invention however, to provide new and improved operating means for the valve, by which sufficient force is exerted upon the same to hold it tightly closed without any danger whatever of leakage, the construction however being such that when the pressure recedes below a given degree, the valve will again easily open.

A further object of the invention is to provide a pressure-controlled valve in which manually operated means are provided, independently of the pressure-influenced actuating member of the valve, for positively holding the valve member closed if access should be had to said pressure-influenced member for the purpose of making repairs or replacements.

The type of pressure-controlled valve herein disclosed, includes two chambers, one in direct communication with the fluid outlet from the valve body and the other in communication with a chamber which controls a diaphragm or other pressure-affected member, and these two chambers are in communication by means of a port. It is a further aim to provide for closing this port when the above-named manually-actuated means are operated to positively close the valve independently of the diaphragm or other pressure-influenced member.

It is a still further object of the invention to provide means whereby a pressure-containing line may be connected with the chamber for controlling the diaphragm or the like when the above-named port is closed, so that if desired, the operation of the valve may be controlled by pressure from a remote point, such pressure being independent from the fluid permitted to flow or checked in flow, by the valve.

With the foregoing and minor objects in view, the invention resides in the novel subject matter hereinafter described and claimed, the description being supplemented by the accompanying drawing.

Figure 1 is a vertical sectional view partly in elevation of a pressure regulator constructed in accordance with my invention, the valve means being shown in open position.

Figure 2 is a horizontal sectional view on line 2—2 of Fig. 1.

In the drawing above briefly described, the numeral 5 designates the main body of the improved pressure regulator, said body having an open top 6 and being provided with a pressure inlet 7 and an outlet 8. This body is provided with an internal hollow portion 9 which is in direct communication with the inlet 7, the top and botom of said portion 9 being formed with relatively large and small openings 10 and 11 respectively. Upper and lower seat rings 12 and 13 are threaded into the openings 10 and 11 respectively, the internal diameters of said seat rings being preferably uniform. The upper seat ring 12 is of such size that it may readily be removed from the body 5 through the opening 6 of the latter, and the seat ring 13 is of such size that it may be upwardly removed through the opening 10. Preferably, both of these seat rings are provided with sockets 14 for engagement with a spanner wrench so that they may readily be removed when desired, and when said rings are in operative position, they tightly seat upon gaskets 15 which prevent leakage.

A valve assemblage 16 is provided with upper and lower valves 17 and 18 co-operable with the seat rings 12 and 13 respectively, each of these valves being preferably provided with an elastic ring 19 to seat on a knife-edge seat 20, the rings 12 and 13 being provided with these seats. The valve assemblage is also preferably provided with guide fingers 21 which hold the valves in concentric relation with the seat rings, and said assemblage is preferably so formed from different sections that it can readily be disassembled for the purpose of renewing the rings 19 or making any other necessary repairs. This assemblage preferably terminates in an upstanding stub 22 which is within the confines of the opening 6 and projects somewhat above the body 5. It may also be explained at this point that the entire valve assemblage is of such size that it may be upwardly withdrawn through the opening 6, when the seat ring 12 is unthreaded from the opening 10. After this withdrawal of the valve assemblage and the ring 12, the seat ring 13 may be upwardly removed. Thus, any necessary repairs on the valves and seats may be made, or new parts substituted with ease, and any of these operations may be performed without the necessity of disconnecting the main body 5 from the pipes which are connected with the inlet and outlet 7—8.

An auxiliary body 23 is mounted upon the body 5 over the opening 6 thereof, said auxiliary body carrying operating and pressure-influenced control means for the valve assemblage. This auxiliary body is so connected with the main body 5 that it may be readily removed therefrom to expose the opening 6, and provision is made whereby operating connections for the valve assemblage may be disconnected to permit the removal of said auxiliary body, without interference by said connections.

In the construction shown, the auxiliary body 23 is provided at its lower portion with an outstanding flange 24 secured by cap screws 25, upon the body 5, a gasket 26 being interposed between said flange and body. The auxiliary body 23 also includes a chamber 27 to receive pressure from the interior of the body 5, the bottom 28 of this chamber serving to normally close the opening 6 and being itself formed with an opening 29 through which the stub 22 passes, a ball bearing 30 being preferably provided at the wall of said opening 29 to permit easy operating of the stub and the associated valve assemblage. 31 merely designates a pressure conducting port from the interior of the body 5 to the chamber 27.

In the present showing, the auxiliary body 23 includes a diaphragm chamber 32 which, by means of an appropriate passage 33 is in communication with the chamber 27, and suitably mounted in said diaphragm chamber 32, is a diaphragm 34 which is accessible by removing retaining bolts 35. Operating connections are provided between the diaphragm 34 and the stub 22 and provision is made whereby said connections may be disconnected when the auxiliary body 23 is to be removed from the main body 5. In the present showing, a stub 36 projects downwardly from the diaphragm 34 through the passage 33 and has its lower end pivoted at 37 to one arm of a bell crank 38. At 39, this bell crank is suitably fulcrumed in the chamber 27, and said fulcrum 39 is transverse to and disposed upon the axial line of the valve assemblage. The other arm 40 of the bell crank 38 is pivoted at 41 to the upper end of a link 42, and the lower end of this link is pivoted at 43 to the stub 22. The bell crank arm 40 and the link 42 constitute a toggle for controlling the opening and closing movements of the valve assemblage 16, and when the diaphragm 34 is raised by pressure and the valves 17—18 stand in closed position, this toggle is substantially straight, the pivot 41 being then only about four degrees from the common plane of the fulcrum 39 and the pivot 43. In moving toward this position, the toggle exerts a closing force on the valve assemblage, many times as great as the force applied to the bell crank 38 at the pivot 37, and this force is such as to hold the rings 19 so tightly seated upon the knife edges 20, that no possible leakage can take place. When the pressure recedes sufficiently to permit lowering of the diaphragm 34 under the influence of the weighted lever 44, the toggle will again open the valve assemblage, and attention may be directed to the fact that the valve arrangement is such that the pressure exerts the same force on the lower valve 18 tending to close the latter, as it does upon the upper valve 17 tending to open this particular valve. Thus, such a balanced valve is produced as to insure easy operation thereof, making the regulator sensitive to small variances of pressure.

The lever 44 is preferably fulcrumed on top of the diaphragm chamber 32 and its weight 45 may be adjusted according to the pressure at which the valve is to open and close. To transmit motion between the lever and the diaphragm, a thrust pin 46 is employed, and the top of the chamber 33 is provided with a loosely packed stuffing box 47 through which this thrust pin passes, said stuffing box serving to exclude foreign matter and moisture which might act to the detriment of the diaphragm.

Whenever the regulator needs repairing or reconditioning for one reason or another, and access must be had to the valves, it is of course necessary to remove the auxiliary body 23 from the main body 5, but before this can be done, the operating connections between the diaphragm and the valve assemblage 16, must be disconnected. To give access to these operating connections, I provide the auxiliary body 23 with an opening 48 which is normally closed by a removable plate 49, the latter being secured normally in place against a suitable gasket 50 by cap screws or bolts 51ª.

Removal of the plate 49, gives access to the pivot 41, the latter being preferably in the form of a screw so that it may be readily removed. Then, removal of the screws or the like 25, will permit lifting of the entire upper body 23 and associated parts, from the body 5 and the contained valve means, the bottom plate 8 of the chamber 27 then withdrawing from the stub 22, it being understood that the link 42 is of such size as to pass through the opening 29. Now, by means of a spanner wrench, the seat ring 12 may be unthreaded from the opening 10, permitting this ring and the valve assemblage 16 to be upwardly withdrawn through the open top 6 of the body 5. This having been done, a wrench may be used to unthread the seat ring 13 from the opening 11, so that said ring 13 may be removed from the body 5. Thus, any required repairs or replacements of the valve means may be made at the point at which the regulator is installed, without the necessity of even so much as disconnecting one end of the main body 5, from the piping or main.

The upper section of the valve body is formed with a threaded opening 51 into which the upper end of the port 31 opens, said opening 51 being disposed opposite the pivotally connected ends of the link 42 and the bell-crank 40. Threaded into this opening 51, is a plug 52 which is accessible when the screw plug 53 is removed from the outer end of said opening. The inner end of plug 52 is provided with an extension 54 adapted to abut the pivotally connected ends of the parts 40 and 42 when said plug 52 is threaded inwardly by means of a screw driver or the like. Thus, the aforesaid parts 40 and 42 will be moved into such relation as to close the entire valve assemblage and tightly hold it closed. At the same time, plug 52 moves across the upper end of the port 31 and closes the latter. Then, necessary portions of the casing may be disconnected to give access to the diaphragm 34, for the purpose of either repairing the latter or replacing it with a new one, and there is no danger whatever of any fluid escaping from the pipe or main connected either with the inlet 7 or the outlet 8.

When the port 31 is closed, for instance by a plug threaded into the opening 51 in place of the plug 52, the diaphragm 34 may be controlled independently of the pressure passing through the valve, by controlling the pressure in the chamber 27. In order that such pressure may be controlled from a remote point if desired, I provide a socket 55 in the upper section 23 of the valve structure, and a port 56 is shown leading from this socket to the chamber 27. While a plug 57 is shown closing the socket 55, this plug may be removed and a pipe line tapped into said socket for conducting the diaphragm controlling pressure to the chamber 27.

Those skilled in the art will observe certain similarity between the present disclosure and pressure regulators which have for years been in general use. They will also however appreciate the improvements which I have made, residing principally in the novel provision for accessibility to working parts at the point at which the valve is installed, in the improved mechanism for so tightly seating the valve means, as to prevent any leakage, in the means for cutting off communication between the hollow body 5 and the chamber 28 and locking the valve in closed position so that the diaphragm or the like 34 may be renewed or repaired without the escape of fluid pressure from the pipe line or main, and in the provision of means permitting control of the valve from a remote point. These cardinal features provide a pressure regulator which will effect a tremendous saving in numerous industries, and while such features are preferably embodied in the forms herein disclosed, it will be understood that within the scope of the invention as claimed, numerous variations may be made. Furthermore, it will be understood that such terms as "upper", "lower", "top" and "bottom" are merely used to denote general relation and are not to be considered as restricting the invention to use in any particular position.

I claim:—

1. A pressure regulator comprising a main body having an inlet and an outlet and containing valve means, said body having an opening through which said valve means may be removed totally; an auxiliary body removably secured to the main body and closing said opening, said auxiliary body being provided with control means for said valve means; connecting means between said valve means and said control means, and a readily removable plate carried by one of said bodies for giving access to said connecting means for the purpose of disconnecting the same, permitting removal of said auxiliary body and removal of said valve means.

2. A pressure regulator comprising a main hollow body open at its top and having an inlet, an outlet, and an inwardly projecting hollow portion in direct communication with said inlet, said inwardly projecting portion being formed with axially alined relatively large and small openings in its top and bottom respectively, an upper seat ring threaded removably in the upper relatively large openings and of a size permitting upward removal through said open top of the body, a lower seat ring threaded removably in the lower relatively small opening and of a size for upward removal through said upper relatively large opening, and a valve assemblage having two valves downwardly closable against said seat rings, both valves being of a size for upward removal through said open top of the body, and the lower valve being sufficiently small to pass through said upper relatively large opening; an auxiliary body removably secured to said main body over the open top thereof and including a chamber in communication with said main body to receive fluid pressure therefrom, a pressure-actuated control member under the influence of said fluid pressure and carried by said auxiliary body, operating connections between said control member and said valve assemblage, and a readily removable plate carried by said auxiliary body, removal of said plate giving access to said operating connections, the latter having portions which are then readily disconnectible, permitting removal of said auxiliary body from the main body and allowing removal of said valve assemblage and seat rings.

3. A pressure regulator comprising a main hollow body open at its top and having an inlet, an outlet, and an inwardly projecting hollow portion in direct communication with said inlet, said inwardly projecting portion being formed with axially alined relatively large and small openings in its top and bottom respectively, an upper seat ring threaded removably in the upper relative large opening and of a size permitting upward removal through said open top of the body, a lower seat ring threaded removably in the lower relatively small opening and of a size for upward removal through said upper relatively large opening, and a valve assemblage having two valves downwardly closable against said seat rings, both valves being of a size for upward removal through said open top of the body and the lower valve being sufficiently small to pass through said upper relatively large opening; said valve assemblage having an upstanding stub projecting through said open top of the body; an auxiliary body removably secured to the main body and having a bottom plate closing said open top of the main body and formed with an opening through which said stub projects slidably, said auxiliary body having a chamber to receive fluid pressure from the main body, the bottom of said chamber being formed by said bottom plate, a pressure-actuated control member under the influence of said fluid pressure and carried by the auxiliary body, operating connections between said control member and the aforesaid stub, said operating connections being disposed in said chamber, and a readily removable plate for giving access to said operating connections to disconnect the same when the auxiliary body is to be removed from the main body, the aforesaid bottom plate being upwardly movable from said stub as said auxiliary body is removed, thereby exposing the open top of the main body and permitting removal of the valve assemblage and seat rings.

4. In a pressure regulator, an annular valve seat, a valve co-operable with said seat, a bell crank spaced from said valve in the direction of its opening movement, the fulcrum of said lever being disposed on and transverse to the axial line of the valve and valve seat, a pressure-actuated control member connected operatively with one arm of said bell crank, and a link pivoted to the other arm of the bell crank and to the valve, said other arm and link forming a toggle for operating the valve, said toggle being substantially straight when the valve reaches closed position.

5. In combination with a pressure regulating valve embodying a movable valve member, and a pressure influenced member operatively connected with said valve member for controlling the same; manually controlled means for locking said valve member in closed position independently of the action of said pressure influenced member, permitting replacing or repairing of the last named member while the pressure is held in check by the valve member.

6. In combination with a pressure regulating valve having a movable valve member disposed in a main chamber having a fluid inlet and a fluid outlet, a pressure-influenced member operatively connected with said valve member, a second chamber to receive the pressure for controlling said pressure-influenced member, and a port between the two chambers; manually actuated means for closing said port to cut off communication between the two chambers, and manually actuated means for then locking the valve member in closed position, permitting replacing or repairing of the pressure-influenced member without permitting the escape of pressure.

7. In combination with a pressure regulating valve having a movable valve member disposed in a main chamber having a fluid inlet and a fluid outlet, a pressure-influenced member operatively connected with said valve member, a second chamber to receive the pressure for controlling said pressure-influenced member, and a port between the two chambers; combined manually actuated means for simultaneously closing said port and locking said valve member in closed position, permitting replacing or repairing of the pressure-influenced member without permitting the escape of pressure.

8. A pressure regulating valve comprising a main chamber having a fluid outlet and inlet, a valve member within said chamber for permitting or cutting off communication between said inlet and outlet, an auxiliary chamber, a pressure influenced member subjected to the pressure of said auxiliary chamber, operating connections between said pressure-influenced member and said valve including a portion within said auxiliary chamber, the wall of the latter having a threaded opening from its exterior to its interior adjacent said portion of said operating connections, said opening being normally in ported communication with the first named chamber, and a plug threaded into said opening, said plug having a portion to cut off the ported communication between said opening and the first named chamber and being also provided with a portion to engage the specified portion of said operating connections when the plug is inwardly moved, substantially as and for the purpose set forth.

9. A pressure regulating valve comprising a main chamber having a fluid inlet and an outlet, valve means in said chamber for either permitting or cutting off communication between said inlet and outlet, an auxiliary chamber in communication with the first named chamber, a pressure-influenced member subjected to the pressure within said auxiliary chamber, connecting means between said pressure-influenced member and said valve means, means permitting communication between the two chambers to be cut off, and means permitting the connection of a fluid line with said auxiliary chamber.

In testimony whereof I have hereunto affixed my signature.

ROY E. JOYCE.